(12) United States Patent
Horn

(10) Patent No.: US 6,192,414 B1
(45) Date of Patent: Feb. 20, 2001

(54) NETWORK COMMUNICATIONS SYSTEM MANAGER

(75) Inventor: Michael S. Horn, Bethlehem, PA (US)

(73) Assignee: Moore Products Co., Spring House, PA (US)

( * ) Notice: Under 35 U.S.C. 154(b), the term of this patent shall be extended for 0 days.

(21) Appl. No.: 09/013,833

(22) Filed: Jan. 27, 1998

(51) Int. Cl.[7] .................................................. G06F 15/173
(52) U.S. Cl. ........................ 709/239; 709/238; 709/224
(58) Field of Search .................................... 709/239, 238, 709/224, 227; 370/400

(56) References Cited

U.S. PATENT DOCUMENTS

| | | | |
|---|---|---|---|
| 5,852,724 | * 12/1998 | Glenn, II et al. | 709/239 |
| 5,859,959 | * 1/1999 | Kimball et al. | 709/239 |
| 5,925,137 | * 7/1999 | Okanoue et al. | 709/239 |
| 5,931,916 | * 8/1999 | Barker et al. | 709/239 |
| 5,935,215 | * 8/1999 | Bell et al. | 709/239 |

* cited by examiner

*Primary Examiner*—Zarni Maung
*Assistant Examiner*—Philip B. Tran
(74) *Attorney, Agent, or Firm*—Seidel, Gonda, Lavorgna & Monaco, PC

(57) ABSTRACT

A system for and a method of managing a communications network through the use of multiple network connections. The system prepares at least two transport service providers of a node for establishing a network connection with corresponding transport service providers of another node and associates the at least two transport service providers with each other and with a requesting application. The system monitors network connection condition and determines availability and suitability of each network connection. The system selectively transmits information via a selected network connection. The system seamlessly establishes the multiple connections and transmits the information over the selected network connection and is transparent to the application.

17 Claims, 13 Drawing Sheets

NETWORK COMMUNICATIONS SYSTEM MANAGER

FIELD OF THE INVENTION

The present invention relates generally to communications networks. More particularly, the present invention relates to a communications network system which provides a backup or redundancy capability through multiple network connections.

BACKGROUND OF THE INVENTION

Communication networks have become ubiquitous in today's society. For example, networks are used for such diverse purposes as internet searching and data transfer, satellite telecommunication networks, and process plant control.

With communication systems supporting large scale processing plants and global telecommunication systems, the failure of the system can translate into thousands or even millions of dollars in lost product or time. In light of the cost of system failure and the widespread use of communications networks by industry, it is more important than ever to provide reliable systems which will ensure continuous delivery of information in the most effective and efficient manner.

In general a communications network system includes a plurality of inter-connected nodes. Each node will typically include a computer station. The computer station can range from a high end server or router to a work station to a desktop/laptop PC to a handheld personal digital system.

At least one software application program (hereinafter referred to as "application") will be resident in each computer station. Such an application could be an internet web browser, a database program or a process plant systems manager program, for example. In order for the application to communicate over the network a stack of communication protocols are necessary. An example of such a stack is the 7-layer reference model approved by the International Standards Organization. The protocols receive information from the application and prepare the information for transmission. The protocols transmit the information via a network card to the network. The same occurs in reverse for incoming data.

Each protocol stack includes a transport service provider (TSP) protocol, for example TCP/IP (Transmission Control Protocol/Internet Protocol). In order for the application and the TSP to communicate they must be compatible. In other words, they must talk the same language. However, since different entities typically design the applications and the TSPs, it is not uncommon for the two elements to be incompatible.

To ensure compatibility between the applications and the TSPs, a node can 1) use only proprietary elements which are compatible by initial design, 2) use applications compatible with a variety of TSPs, or 3) provide an open standard.

The first two options fail to provide a desirable solution to the compatibility issue. The use of proprietary systems limit one's options in features, capabilities and design when selecting a supplier for the applications and TSPs. This will also tend to lock a user into one system when expanding or upgrading the system. Designing the application to be compatible with multiple TSPs or vice versa adds a significant amount of code to the items, thereby increasing complexity, time and effort in the design. This typically translates into higher costs for the item, decreased features or capabilities, and increased opportunity for failure.

Another alternative is an interface which would reside between the application and the TSP. Such an interface would provide an avenue for a variety of applications to communicate with a variety of TSPs which are not necessarily compatible. A node having an application and a TSP written to work with the interface can utilize any such application to communicate with any such TSP.

An example of such an interface is Windows Socket 2.0 (hereinafter referred to as "Winsock"). A group of software and hardware developers developed Winsock to resolve the aforementioned compatibility issue and to spur development of various and diverse applications and systems. gWinsock is an interface that is used by applications running on Windows 3.X, Windows for Workgroups, Windows NT, Windows 95, and future Windows operating systems, for example.

Winsock is a .DLL (dynamic link library) and serves as the interface to the TSP. TCP/IP is the "language" that computers on the Internet use to communicate with each other. Winsock was initially written to take advantage of TCP/IP. FIG. 1 illustrates an example utilizing Winsock to communicate over a network. As shown in FIG. 1, Winsock acts as a layer between a Winsock compliant application and the TSP. The application tells Winsock what to do, Winsock translates these commands to the TSP, and the stack passes the data to the network.

The use of Winsock allows a variety of applications, which have been written to comply with Winsock, to communicate with a variety of TSPs which also have been written to comply with Winsock.

The Winsock 2.0 DLL is defined by Microsoft Corporation and is based on Berkeley Sockets. It allows both a connection and a connection-less communications path. The interface between the Winsock.DLL and the TSP is the Winsock 2.0 Service Provider Interface (SPI). The SPI allows any network card and protocol developer to create DLLs that can be easily plugged into the Winsock architecture. The interface between the TSP and the network card driver is typically proprietary and goes directly to the hardware driver. The Winsock architecture is designed to be backward compatible with the Winsock 1.1 specification at a binary level. Therefore any Winsock 1.1 compliant application will not have to be recompiled when Winsock 2.0 is introduced into the system. For a better understanding of how to utilize Windows sockets and understand the Windows sockets programming language, reference may be made to Windows Sockets 2 Service Provider Interface Manual, Revision 2.2.2, Aug. 7, 1997 and the Windows Sockets 2 Application Programming Interface Manual, Revision 2.2.2, Aug. 7, 1997, which those skilled in the art will be familiar with.

The introduction of Winsock provided a much needed tool for the use of heretofore incompatible applications and TSPs.

As stated above, the need for reliable communication networks is paramount in a number of industries. In networked systems which implement the Winsock architecture, several schemes have been set forth which attempt to provide satisfactory redundancy/backup systems for communication networks. A first system makes changes at the application level. The applications are written to provide for multiple network connections each time a single connection is required by the application. This requires complex changes to each application to implement a redundancy/backup scheme. This solution is costly and requires each and every individual application developer to either revise an existing application or take more time to create a new application. Applications which are not specifically written to implement redundancy/backup would not provide a reliable system. A second solution implements another layer of code which resides between the Winsock DLL and any and all resident applications. This requires an additional program which would have to work with application programming interfaces for each and every application with which it wishes to work. A third solution of providing backup/redundancy can be implemented at the hardware level. This solution provides multiple communication paths through multiple physical connections in a single hardware network card. This has been done by hardware network card manufacturers who make Ethernet boards that have two ports on them. The redundancy/backup scheme is defined in hardware and drivers so that the operating system "sees" a standard single media network card. This scheme includes a very high cost due to the limited availability of these types of cards, limited choice for hardware manufacturers, and inflexibility of the redundancy/backup scheme since they are implemented in hardware and low level drivers. The multiple physical communication media is limited to a total of two and are required to be the same exact physical network types.

In light of the foregoing drawbacks presented by conventional systems, there are currently no systems available which fully utilize the advantages of the Winsock architecture to provide a communications network system which will effectively and efficiently provide reliable redundant/backup network connections.

SUMMARY OF THE INVENTION

The present invention provides a system for and a method of managing a communications network system to ensure information can be continuously and reliably transmitted through the use of multiple network connections. The network comprises a plurality of nodes or computer stations. Each node is capable of running one or several applications. Each node comprises a plurality of TSPs linked to a network driver. Each TSP-network driver combination is capable of establishing a network connection between itself and a corresponding combination residing at another node. Each node also includes an interface linking one of a plurality of applications resident and active in the node to any one of the TSPs. The interface enables diverse software application programs to communicate with various transport service providers.

When a particular application requires a single network connection and requests such a connection through the interface, the present invention responds to the application request for the network connection and prepares at least two of the transport service providers for establishing a network connection through each of the at least two transport service providers and associates the at least two transport service providers with each other and the requesting application. The network connection is established between each of the at least two transport service providers of a first node and corresponding transport service providers of a second node. The present invention monitors the at least two network connections and determines the availability of each connection. The present invention then selectively transmits application program information via a selected one of the network connections.

The present invention seamlessly establishes the multiple connections and selectively transmits the information over the selected network connection and is transparent to the application.

DETAILED DESCRIPTION OF THE INVENTION

Figure 2:
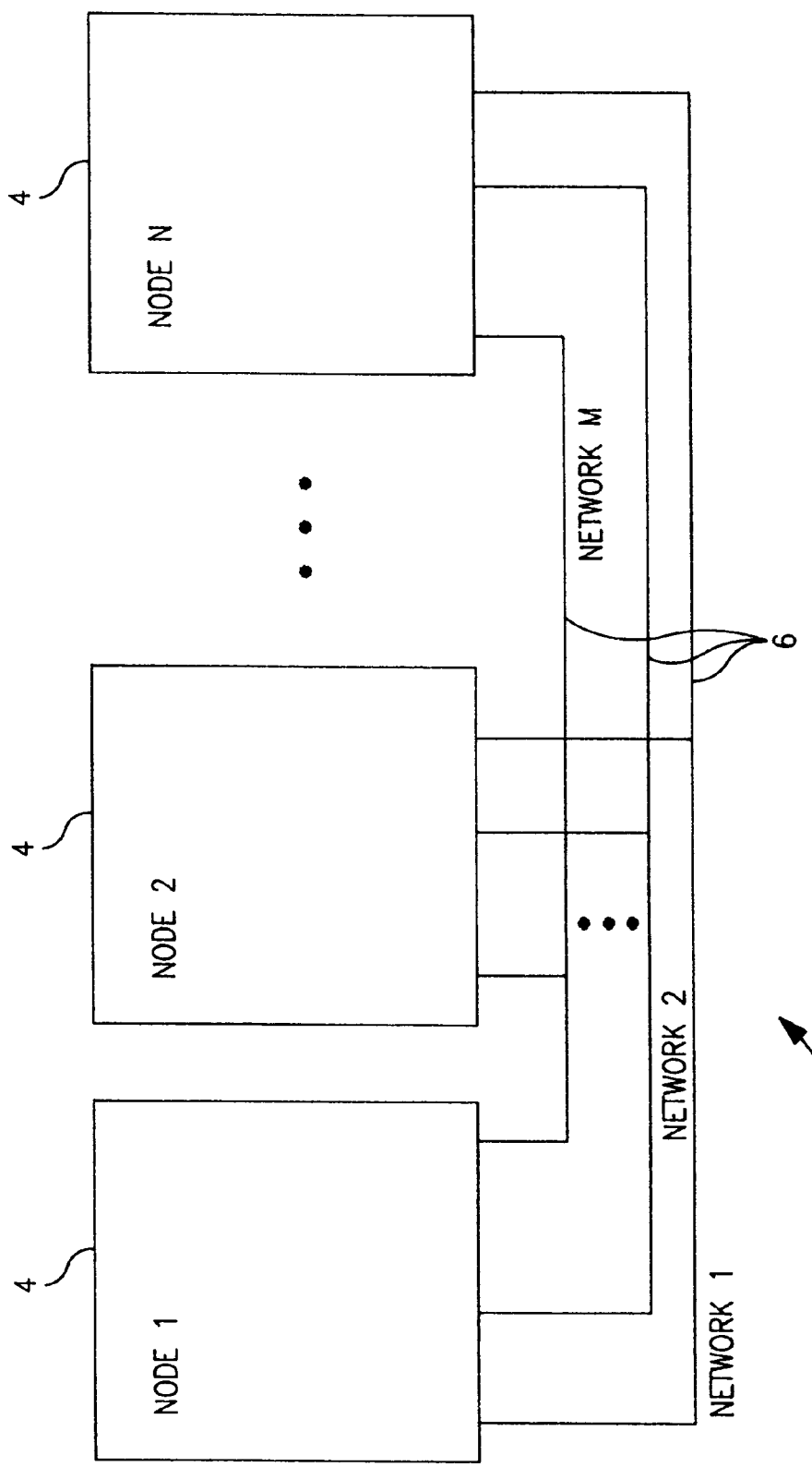
FIG. 2 is a block diagram of a conventional communications network.

The present invention will now be described in conjunction with the attached figures, wherein like elements are identified with like numerals. FIG. 2 illustrates an example of a basic communications network system which utilizes the present invention. The network 2 includes a plurality of N nodes 4. Each node 4 is connected to each of M networks 6. The communications network system 2 may be, for example, the Internet, an intranet, or a process plant network.

Figure 3:
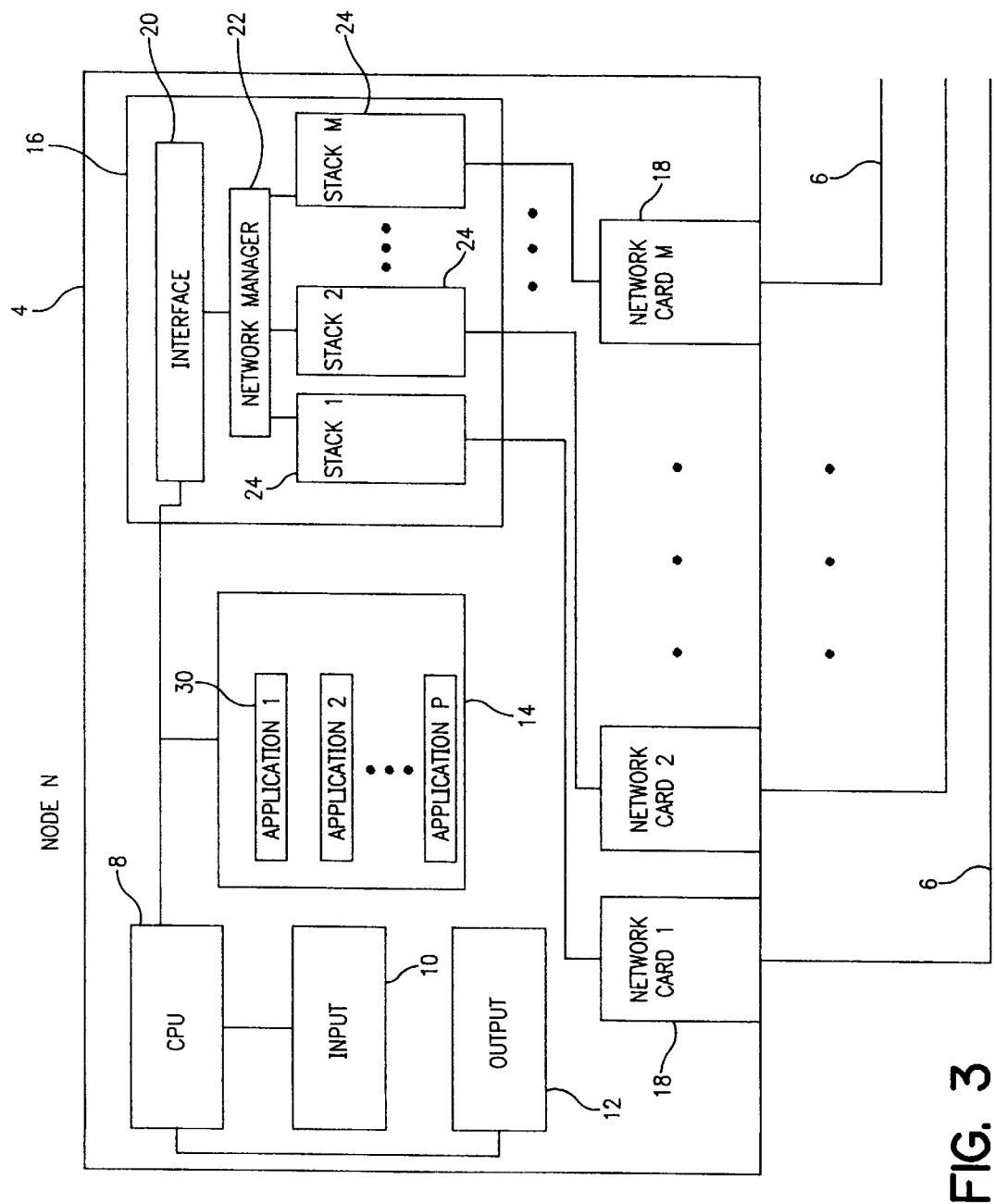
FIG. 3 is a block diagram of a node of a communications network implementing the present invention.

FIG. 3 illustrates one of the nodes 4. The node may also be referred to as a computer wherein the computer includes a CPU 8, an input device 10, an output device 12, software application program memory 14, network communications program memory 16 and a plurality of network cards 18. The CPU 8 may be, for example, an Intel Pentium II processor operating in a Windows 95 environment. The input device 10 may be any of a variety of input devices such as a mouse, a keyboard, a voice recognition system, or other input device. The output device 12 may be any of a variety of devices such as a display monitor or a printer. The memories 14 and 16 may be any computer memory capable of storing program code including for example, a hard disk drive, read only memory (ROM), random access memory (RAM), or an optical disk drive. The memories 14 and 16 may be implemented as a single memory unit or as multiple memory units. The network cards 18 may be, for example an Ethernet card, a card for a wireless local area network (LAN), or a card for a modem. The cards 18 may all be the same or may all be different or any combination thereof. Application memory 14 may store any one of a variety of applications including, for example, an Internet web browser, a factory process control program, or an intranet database program.

The network communications memory 16 includes all of the programs necessary for connecting to a network and transmitting information to and receiving information from another node.

Figure 4:
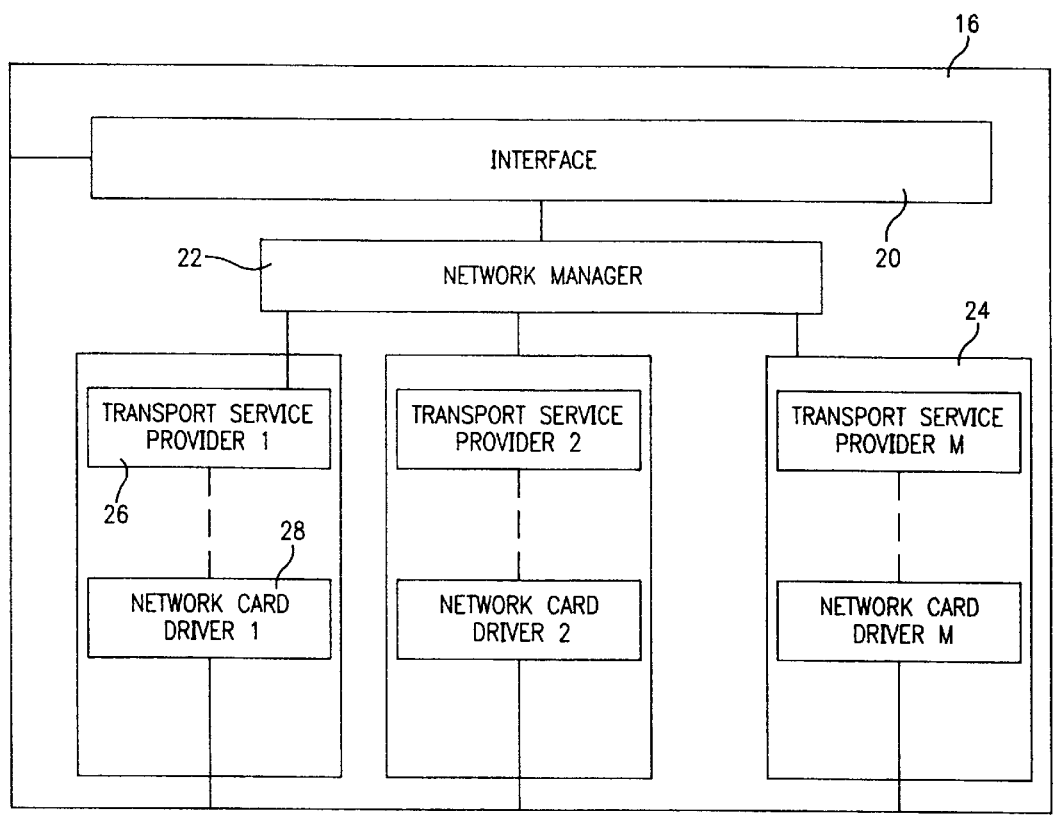
FIG. 4 is a block diagram of a network communications memory of FIG. 3.

FIG. 4 illustrates the network communications memory 16 in more detail. The memory 16 includes an interface module 20, for example the Winsock.DLL, and a network manager 22 which connects to at least two of the multiple protocol stacks 24. Each protocol stack 24 is connected to a network card 18. Each protocol stack comprises a transport service provider (TSP) 26 and a network card driver 28. The combination of the protocol stack 24 and network card 18 comprises a network connection channel from each individual node 4 to a particular network 6.

Figure 5:
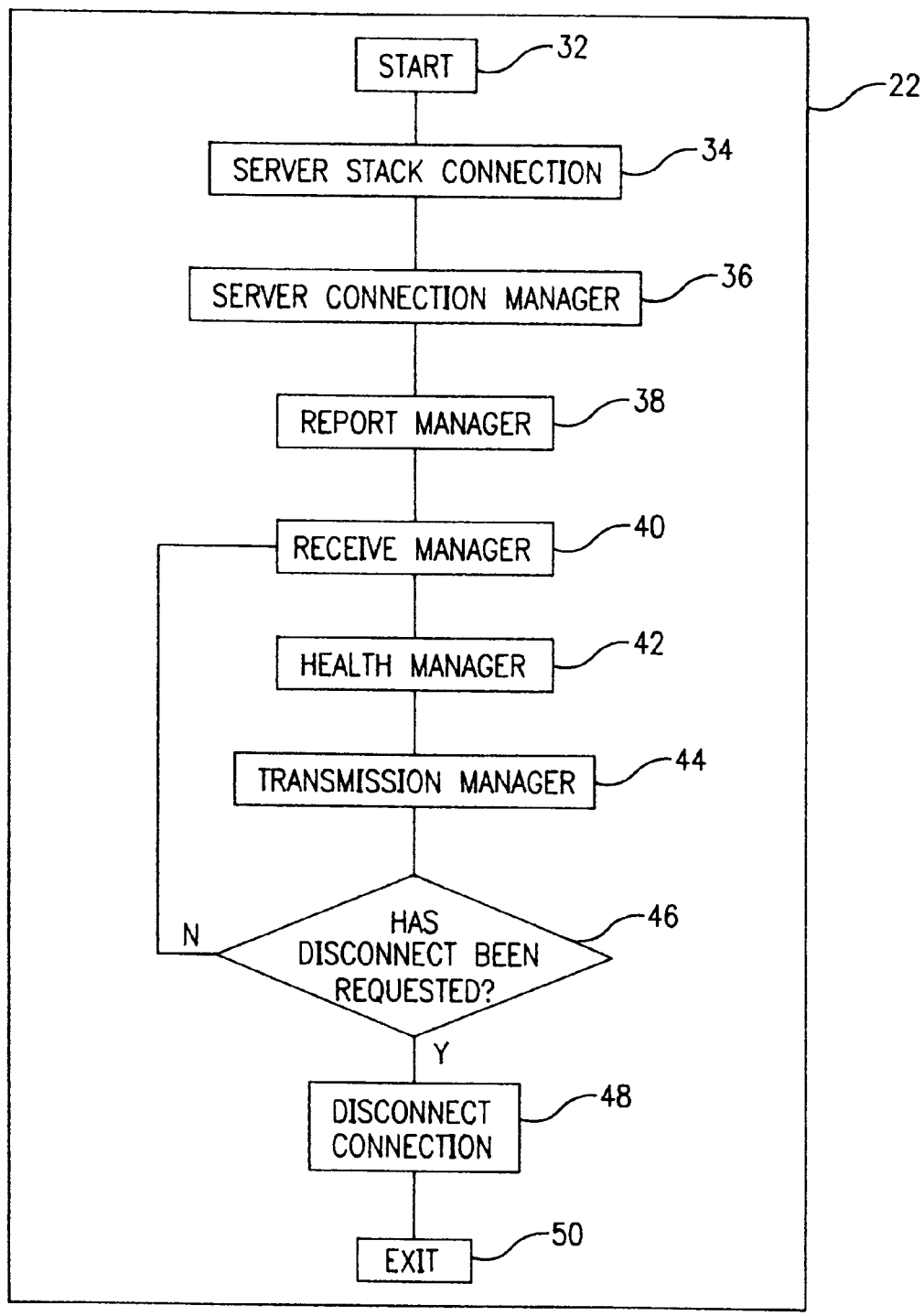
FIG. 5 is a flow chart illustrating an implementation of an element of the present invention.
Figure 6:
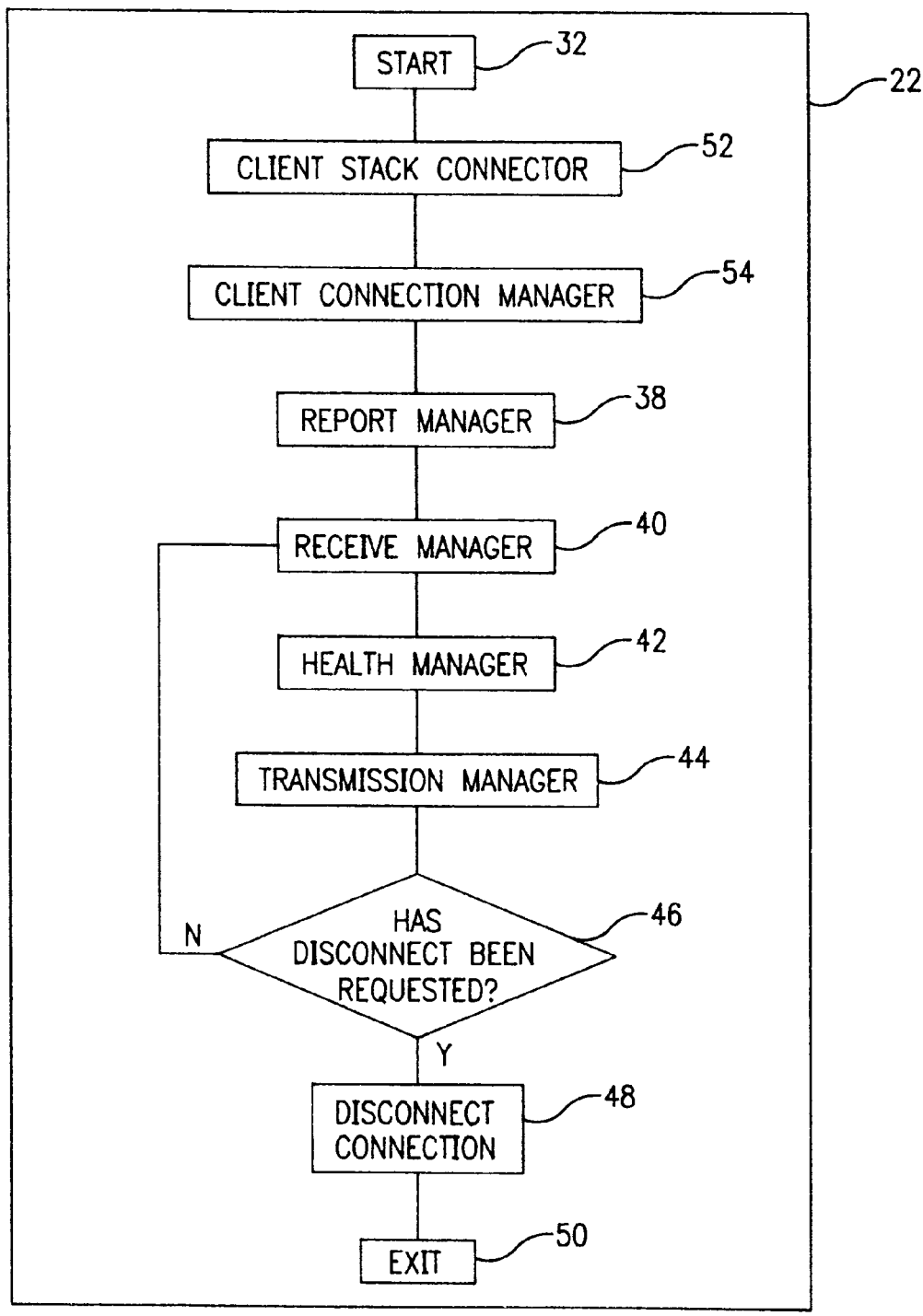
FIG. 6 is a flow chart illustrating an implementation of another element of the present invention.

The network manager 22 of the node 4 operates with the other elements of the node as follows. The network manager 22 operates in a first manner when managing a node in a server mode, as illustrated in FIG. 5, and in a second manner when managing a node in a client mode, as illustrated in FIG. 6. In either a server node or a client node, one of the applications 30 residing in application memory 14 is activated. The application 30 requires a network connection to transmit or receive information. The application 30 requests a single network connection from the interface 20. The interface 20 passes this request to the network manager 22. In response to the request the network manager 22 prepares at least two of the protocol stacks 24 to establish a network connection. The network manager 22 selects as many protocol stacks as is required by the redundancy/backup scheme it is working under, as discussed below. The protocol stacks 24 are prepared for connection to another node and are also associated with each other and the requesting software program application. For example, if the requesting application is a web server the protocol stacks are defined by the socket number 80 which also designates the web server application.

The following flow charts are meant only to assist in understanding the present invention and are not intended to limit the scope of this specific embodiment.

Figure 7:
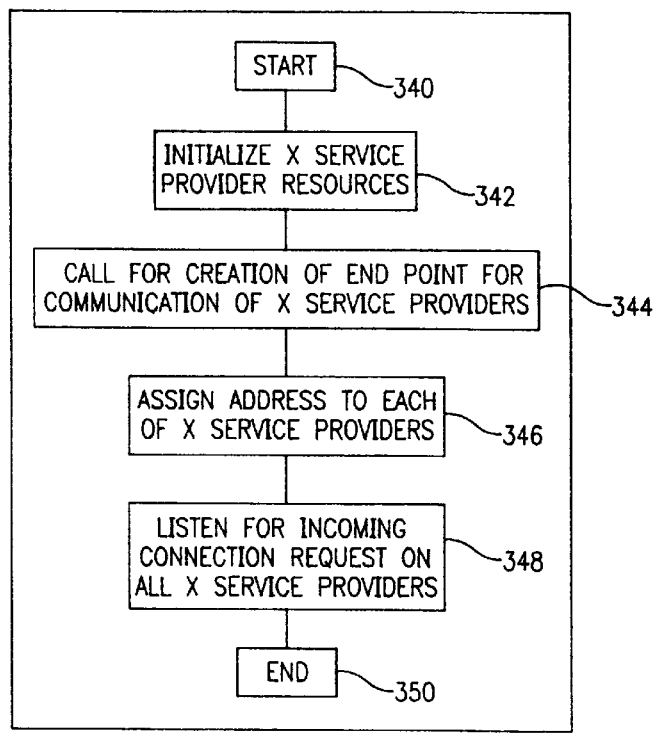
FIG. 7 is a flow chart illustrating an implementation of another element of the present invention.

An example of the procedure the network manager 22 follows in a server mode is illustrated in the flow chart of FIG. 5. The network manager 22 is activated when the interface 20 makes a call requesting a single network connection. Operation of the network manager 22 begins with a call to a start step 32. The network manager 22 then calls a server stack connector 34. The procedure followed by the server stack connector 34 is illustrated in the flow chart of FIG. 7. The server stack connector procedure begins at start step 340. In step 342, the server stack connector 34 initializes X service provider resources in accordance with a preselected redundancy/backup scheme, as discussed below. In step 344, the server stack connector 34 creates an end point for communication of the X service providers. In step 346, the server stack connector 34 assigns an address to each of the X service providers. In step 348, the server stack connector 34 listens for incoming connection requests on all of the X service providers. In step 350, the server stack returns control to the network manager 22.

Figure 8:
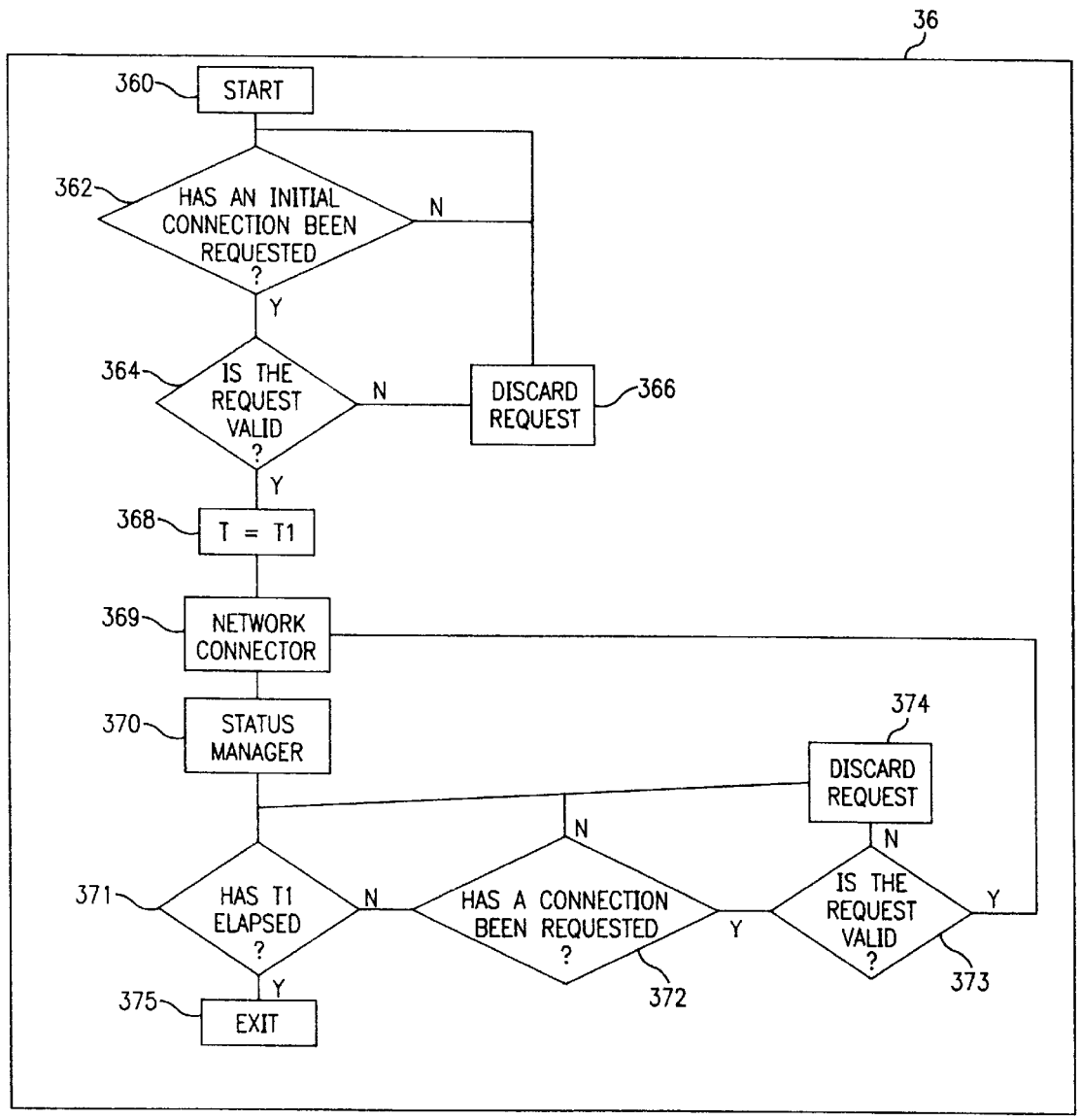
FIG. 8 is a flow chart illustrating an implementation of another element of the present invention.

The network manager 22 then calls a server connection manager 36. The procedure followed by the server connection manager 36 is illustrated in the flow chart of FIG. 8. Operation of the server connection manager 36 begins at a start step 360. In step 362, the server connection manager 36 determines if an initial connection has been requested from another node. If a connection has not been requested, the server connection manager 36 loops back to step 362. If an initial connection has been requested, in step 364 the server connection manager 36 determines if it is an appropriate request. An appropriate request includes one which has the correct address and the correct socket number and includes information indicating it has come from the network manager of another node. This information may be for example some type of tag in the form of bits appended to the request call. An inappropriate request includes one which was initiated by a client node that did not use the network manager 22. Such a request would not include the appended tag. If an inappropriate request is made, the request is discarded in step 366 and the server connection manager 36 loops back to step 362. If an appropriate request has been made, the server connection manager 36 sets a countdown timer to a preselected period T1 at step 368. Once the countdown timer has been set the server connection manager 36 makes a call to a network connector in step 369. The network connector establishes a connection between the requested protocol stack and the corresponding protocol stack of the requesting node. Once the connection is made the server connection manager 36 makes a call to a status manager in step 370. The status manager monitors and marks which TSPs have and have not been connected. If a connection has been established the connection condition is marked as available. Once the status of the TSP and corresponding network connection is marked the server connection manager 36 checks if period T1 has elapsed, in step 371. If T1 has not elapsed, in step 372, the server connection manager 36 checks for another connection request. If a connection request has not been made the server connection manager 36 loops back to check the period T1. The server connection manager 36 continues in this loop until another connection request has been made or period T1 elapses. If another connection request has been made the server connection manager 36 continues to step 373. If the connection request received in step 372 is inappropriate, it is discarded in step 374 and the service connection manager 36 loops back to step 371. If the connection request is appropriate, a connection is made by the network connector, the status manager marks the TSP and corresponding network connection as connected and available and the period T1 is checked again. Once the period T1 has elapsed, the server connection manager 36 returns control to the network manager 22.

Figure 1:
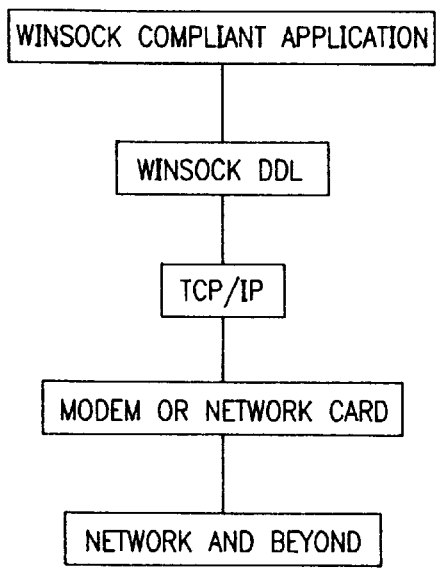
FIG. 1 is a flow chart illustrating implementation of a Winsock interface in a network protocol stack.
Figure 9:
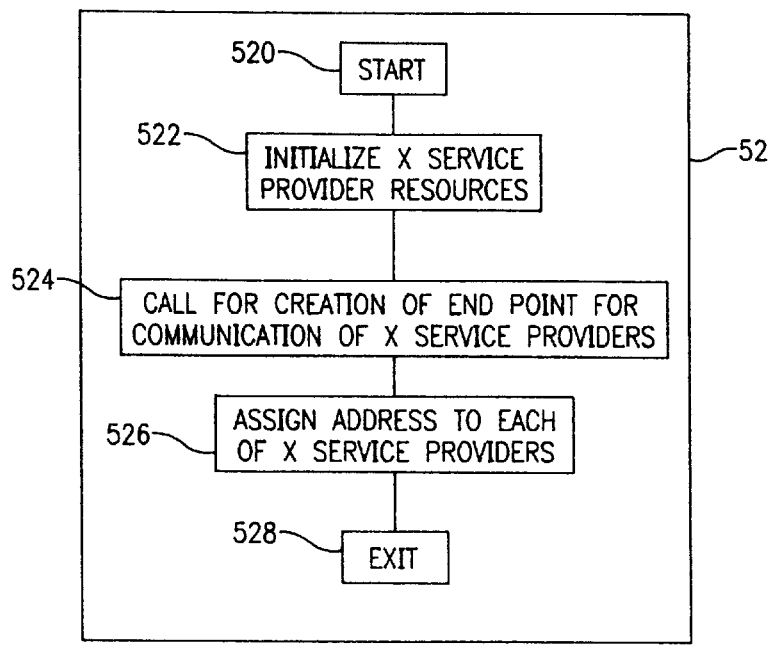
FIG. 9 is a flow chart illustrating an implementation of another element of the present invention.

In a client mode the network manager 22 operates slightly differently from the server mode. In the client mode the network server 22 calls a client stack connector 52. The procedure followed by the client stack connector 52 is illustrated in the flow chart of FIG. 9. Operation of the client stack connector procedure begins at step 520. In step 522, the client stack connector 52 initializes X service provider resources in accordance with the preselected redundancy/backup scheme. In step 524, the client stack connector 52 creates end points for communication of the X service providers. In step 526, the client stack connector 52 assigns an address to each of the X service providers. In step 528, the client stack connector 52 returns control to the network manager 22.

Figure 10:
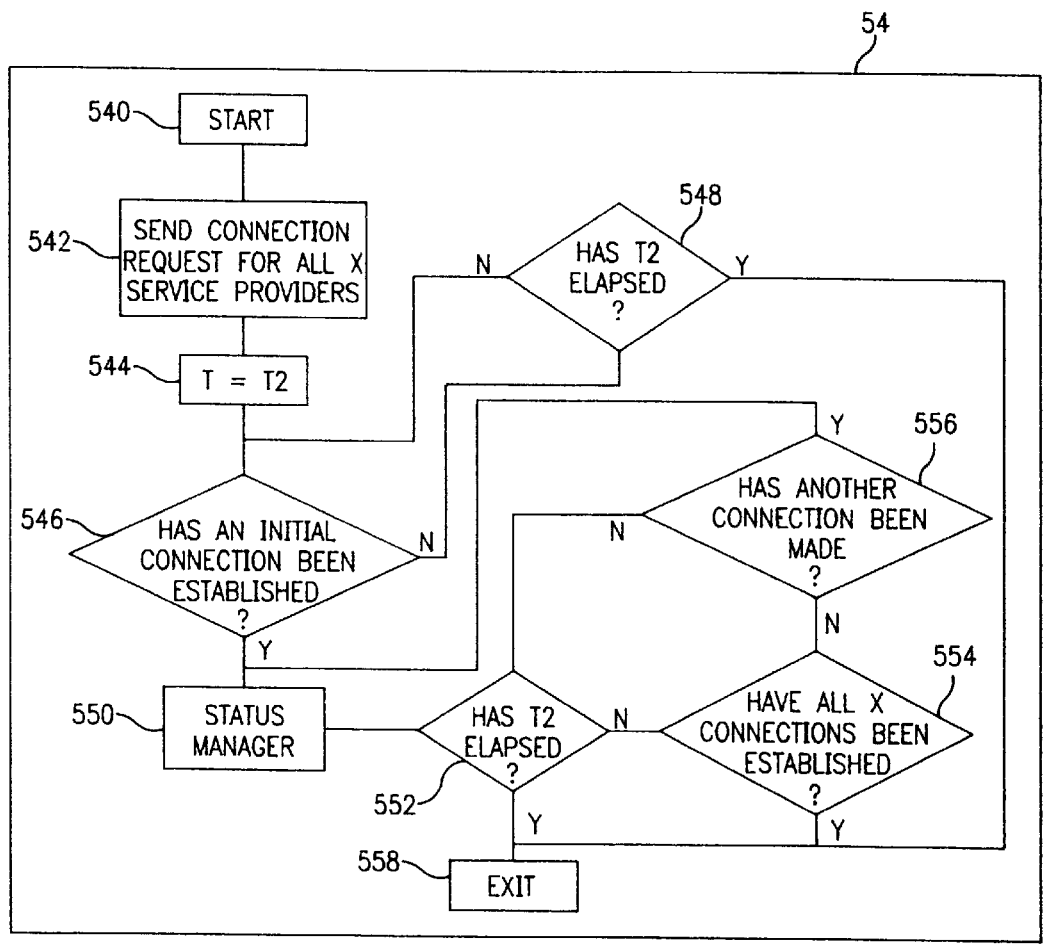
FIG. 10 is a flow chart illustrating an implementation of another element of the present invention.

The network manager 22 then calls a client connection manager 54. The procedure followed by the client connection manager 54 is illustrated in the flow chart of FIG. 10. Operation of the client connection manager 54 begins at step 540. In step 542, the client connection manager 54 sends a connection request to a server node for all X service providers. In step 544, the client connection manager 54 sets a countdown timer to a preselected period T2. In step 546, the client connection manager 54 checks and determines if an initial connection has been established with the server node. If an initial connection has not been established, in step 548, client connection manager 54 checks if the period T2 has elapsed. If the period has not elapsed the client connection manager 54 loops back to step 546. If the period has elapsed, in step 558, the client connection manager 54 returns control to the network manager 22.

If the connection has been established, the client node will receive a signal from the server node. Once an initial connection has been established, the client connection manager 54 calls the status manager in step 550. As in the server mode, the status manager marks the particular TSP and corresponding network connection as connected and available. In step 552, the client connection manager 54 checks if period T2 has elapsed. If the period T2 has not elapsed, in step 554, the client connection manager 54 checks to determine if all of the X connections have been established.

If all of the connections have not been established, in step 556, the client connection manager 54 checks if another connection has been established. If another connection has not been established the client connection manager 54 loops back to step 552. IF another connection has been established the client connection manager 54 loops back to step 550. If all of the connections have been established, in step 558, the client connection manager 54 returns control to the network manager 22. If the period T2 has elapsed before all of the connections have been established, in step 558, the client connection manager 54 returns control to the network manager 22.

In both the server mode and the client mode the network manager 22 then calls a report manager 38. The report manager 38 reports the status (also referred to as "condition") of the individual TSPs 24 and corresponding network connections to a report log using the information established by the status manager. The report log indicates which TSPs have successfully connected to the network and which have not, within the preselected time period. Once the report manager 38 has reported the status of the various TSPs, the network manager 22 calls a receive manager 40.

Figure 11:
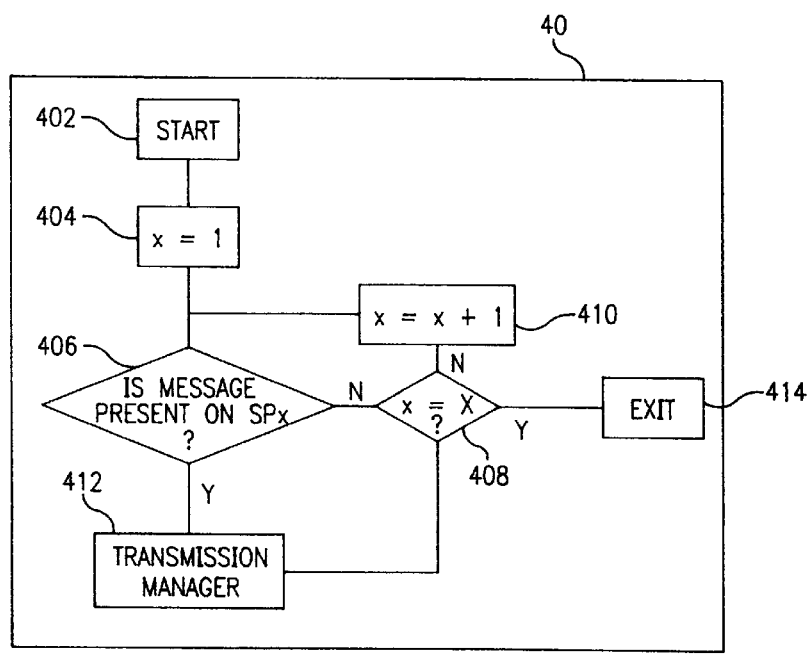
FIG. 11 is a flow chart illustrating an implementation of another element of the present invention.

The procedure followed by the receive manager 40 is illustrated in the flow chart of FIG. 11. Operation of the receive manager 40 begins at step 402. In step 404, the receive manager 40 sets a counter x equal to one. In step 406, the receive manager 40 determines if an incoming message is present at a $TSP_x$. If a message is not present, in step 408, the receive manager 40 determines if the counter x is equal to X, which is equal to the number of TSPs selected by the redundancy/backup scheme currently in operation. If counter x is not equal to X, in step 410, the receive manager 40 increments the counter x by 1 and then loops back to step 406 to determine if the next TSP has a message. If a message is present on the TSP, in step 412, the receiver manager 40 calls a transmission manager. The transmission manager retrieves the message present on the TSP and delivers it to the appropriate application. Once the message is retrieved and delivered, the counter x is again checked to see if all of the current TSPs have been checked. Once all the TSPs have been checked, at step 414, the receive manager 40 returns control to the network manager 22.

Figure 12:
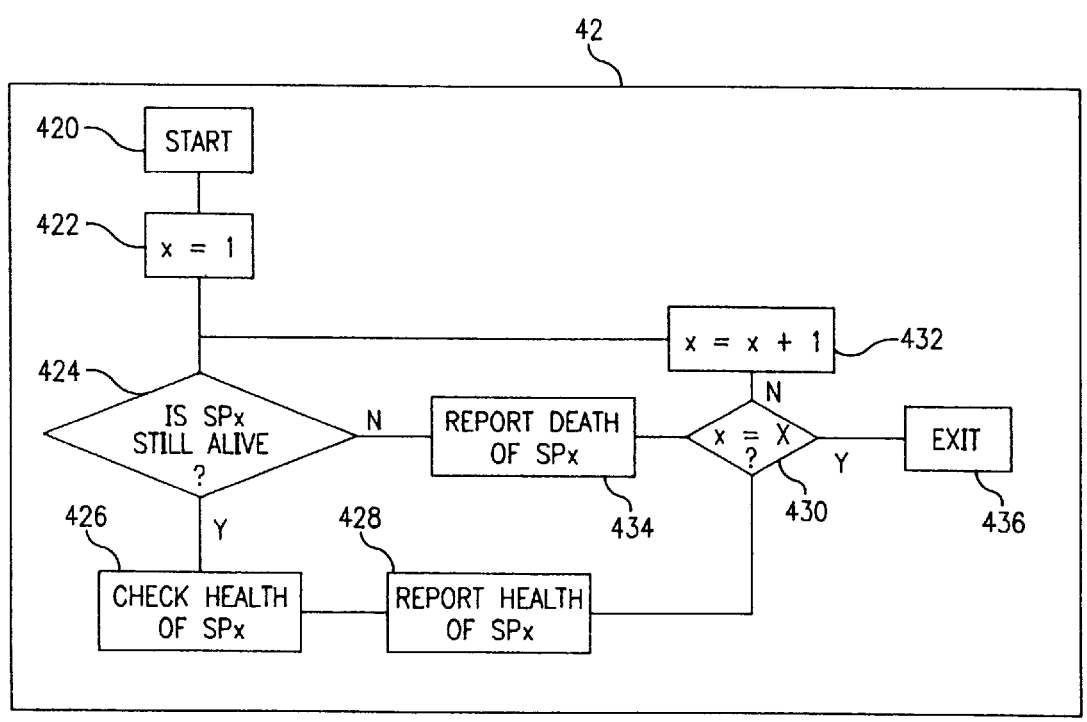
FIG. 12 is a flow chart illustrating an implementation of another element of the present invention.

The network manager 22 then calls a health manager 42. The procedure followed by the health manager 42 is illustrated in the flow chart of FIG. 12. Operation of the health manager 42 begins at step 420. In step 422, the health manager sets a counter x equal to one. In step 424, the status of a connection through a $TSP_x$ is determined. In determining if the network connection is alive, the health manager 42 calls the status manager. The status manager continuously checks the status of every network connection which the particular redundancy/backup scheme requires. This is achieved by a heart beat checker, for example. The heart beat checker sends a pulse down each network connection. If a return signal is received from the other end of the network connection, the status manager knows the network connection is alive and available and reports it as such to a status report. If a return beat is not received the network connection is marked as dead and unavailable in the status report. The status manager will repeatedly check the network connection after a preselected time period. If the node receives a heart beat request from another node, the status manager will mark the network connection as alive and checked and not check it the next period.

Once it is determined that the network connection is alive, in step 426, the health manager 42 checks the "health" of the network connection. This is determined by variables associated with information transmission which are monitored every time information is transmitted over a particular network connection. These variables include but are not limited to transmit time, transmit cost, and wait period before transmission begins. In step 428, the health manager then reports the network connection health to a health report. In step 430, the health manager 42 determines if all of the required network connections have been checked. This is accomplished by checking if the counter x equals X. If all of the network connections have not been checked in step 432, the counter is incremented by one, and the health manager 42 loops back to step 424 to check the next network connection. If a network connection is found to be "dead" the death is reported to the status report, in step 434. Once all of the network connections have been checked, in step 436, the health manager 42 returns control to the network manager 22.

Figure 13:
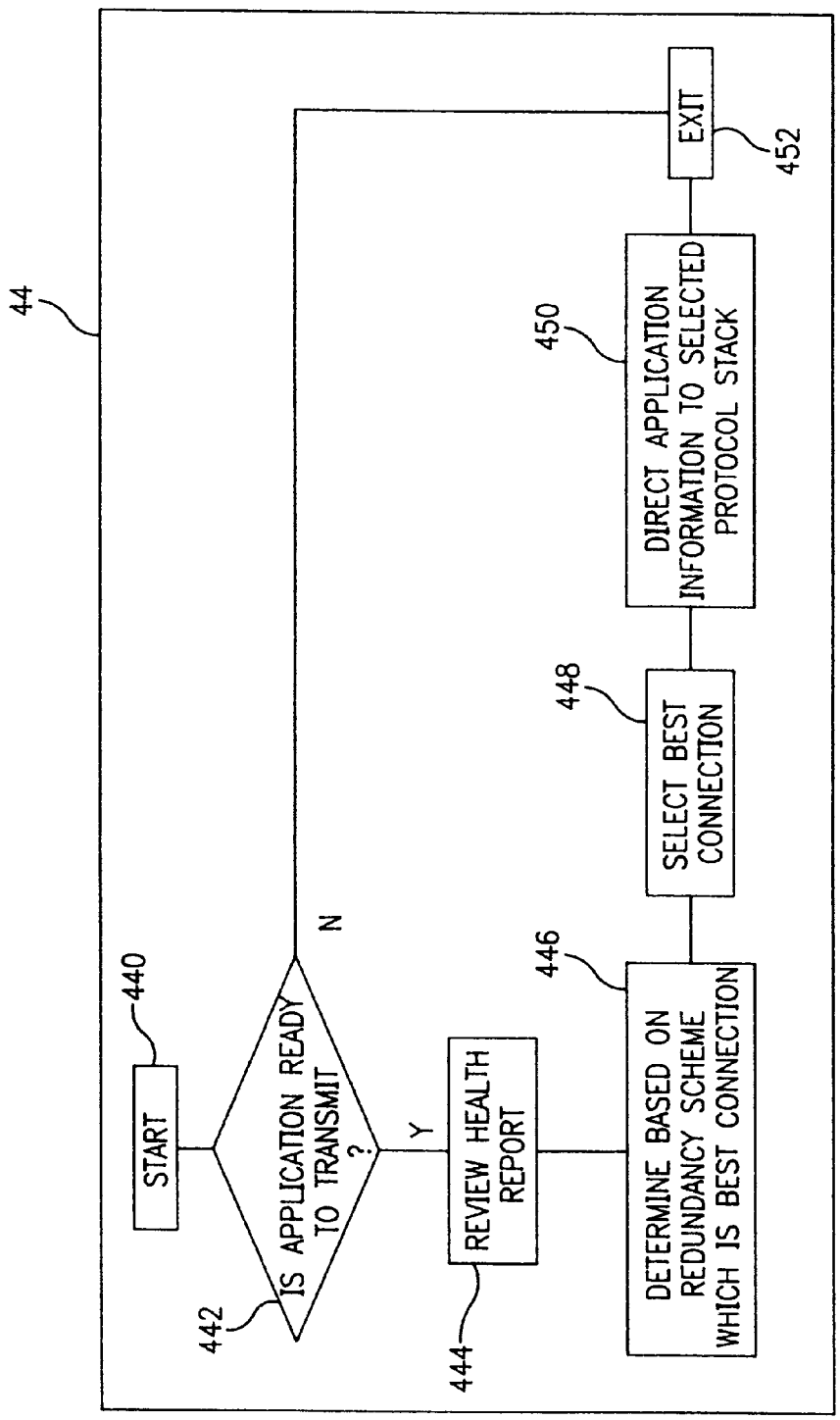
FIG. 13 is a flow chart illustrating an implementation of another element of the present invention.

The network manger 22 then calls the transmission manager 44. The procedure followed by the transmission manager 44 is illustrated in the flow chart of FIG. 13. Operation of the transmission manager 44 begins at step 440. In step 442, the transmission manager 44 determines if any of the applications 30 are ready to transmit information. If an application has called the interface 20 to transmit the interface 20 will call the network manager 22 to transmit. If a program wishes to transmit information, in step 444 a health report established by the health manager 42 is reviewed. Using the predetermined redundancy/backup scheme, the status report and the health report, in step 446, the transmission manager 44 determines which is the most suitable connection to use. In step 448, the transmission manager 44 selects the most suitable connection. Once the connection is selected, in step 450, the transmission manager 44 directs the information to the proper protocol stack for transmission. Once the information is directed, at step 452, the transmission manager 44 returns control to the network manager 22. If none of the applications wish to transmit information, the transmission manager 44 simply returns control to the network manager 22.

In step 46, the network manager 22 determines if a request to disconnect the connection has been received. If no disconnect request is present the network manager 22 loops back to step 40 and calls the receive manager. If a disconnect request has been received the network manager 22 disconnects the connections associated with the disconnect request. The network manager 22 then shuts down and waits for another request from a application to establish a network connection.

Figure 14:
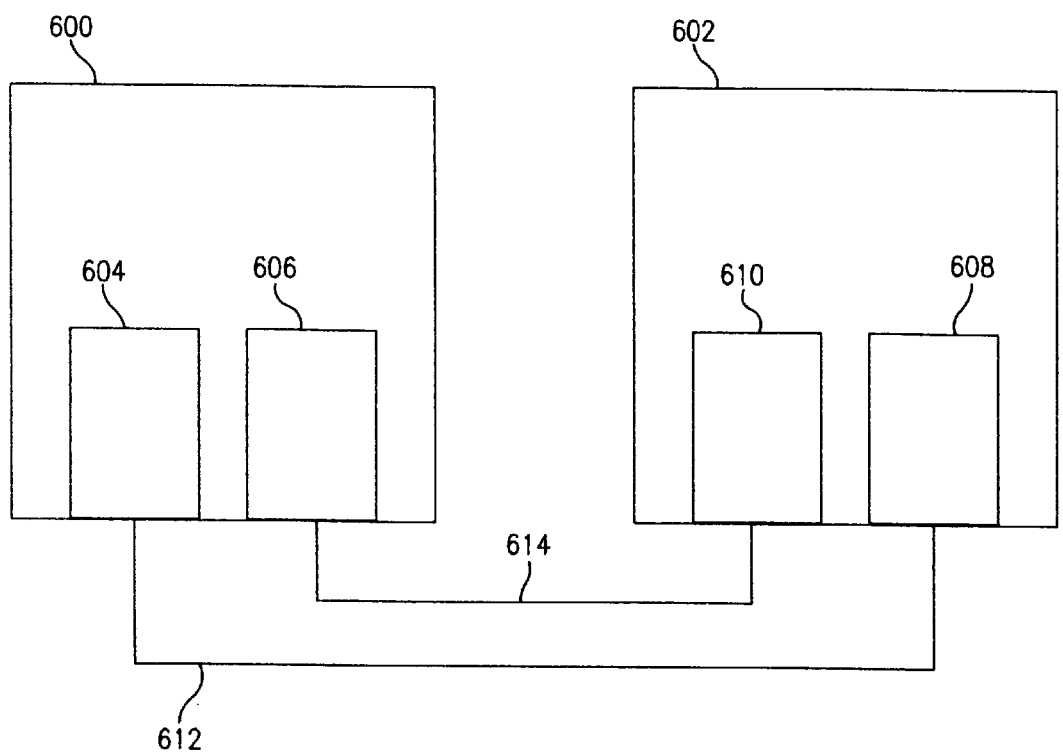
FIG. 14 is a block diagram illustrating two network computer stations.

An example of a network system which does use the present invention and one that does not use the present invention will be helpful in better understanding the present invention. FIG. 14 illustrates two personal computers 600 and 602, each having two independent network cards 604, 606, 608 and 610. A first network, for example an Ethernet network, 612 connects card 604 to card 608. A second independent network, for example but not necessarily another Ethernet network, 614 connects card 606 to card 610. Since each computer 600, 602 has two network cards, each computer has two network addresses. In this example the first computer 600 has addresses PC1IP1 and PC1IP2 and the second computer 602 has addresses PC2IP1 and PC2IP2. In this example both computers are running Winsock software. The first computer 600 is running in the client mode and the second computer 602 is running in the server mode.

The particular application running on the computers is unimportant to the operation of the Winsock program and the network manager for purposes of this example. However, various application programs may introduce changes in the low level operation of the interface and the manager without affecting the overall purpose and scope of the present invention. Table 1 presents an example of Winsock calls when the present invention is not operating. The operation of the Winsock calls results in a single network path over one of the networks 612 or 614. In this example the first network 612 is selected. Either network can be selected, and there is usually no reason to prefer one over the other. Winsock passes the function calls to a network protocol stack corresponding the first network 612 (as discussed above) and then assumes that the same stack is to be used for all future communications. Therefore all packets of information the application wishes to transmit over the network will be routed to the first network 612 regardless of the health or status of the first network 612. The network stacks of the two networks 612, 614 are unaffected by and do not cooperate with each other.

When the present invention, referred to as the network manager, is installed on each of the computers 600, 602 and configured as the default service provider, the Winsock program passes the function calls to it instead of one of the service providers of the various protocol stacks. Tables 2 and 3 show an example of the steps followed by the server and client for a particular application program when the network manager is operational. The first three steps of both the client and the server are the same as in the example wherein the network manager is not running except that both networks are prepared for transmitting information from and receiving information for the application and both networks are associated with each other and the application. In other words, every time Winsock receives a call from an application to establish a network connection Winsock passes that call to the network manager. For every call the network manager receives from Winsock to establish a single network connection, the network manager will establish multiple network connections. In this example two connections are established. However, the number of connections will only be limited to the number of available network cards. Further, the application is unaware that multiple network connections will be established. The first four steps of table 2 correspond generally to the operation of the server stack connector 34, discussed above and the first three steps of table 3 correspond generally to the operation of the client stack connector 52, discussed above.

After the two network connections are prepared and associated with each other and the application, the server waits until it receives a connection request from a client. In step 4 of table 3, the client requests a connection to the server for all of the service providers. Step 4 of table 3 corresponds generally to the client connection manager 54. In step 5 of table 2, the server receives a first connection request from a particular client. Step 5 of table 2 corresponds generally to the server connection manager 36.

After all of the available connections have either been established or determined dead as reported by the report manager 38, the network manager in both the server and the client begins sending and receiving information on the connected networks. Steps 6–13 of table 2 and steps 5–12 of table 3 correspond generally to the receive manager, health manager and transmission manager discussed above.

In the example set forth in tables 2 and 3, the first data information send occurs at step 5 of table 3. In this example, the network manager has directed the information to service provider #1 and therefore the information is sent through service provider #1. The network manager selects the service provider to send the information based upon the information gathered by the health manager, as discussed above and the particular redundancy/backup scheme it is running under, as discussed below. Further, the reception of data on a particular service provider is determined by the decision made by the sending node. The sending node selectively chooses a service provider for transmission in the same manner discussed above. The particular service providers selected in this example merely illustrates one potential combination among a virtually infinite set of combinations.

Another example would have the server network manager determining that service provider #1 is unavailable (dead) and therefore will select service provider #2 every time the server needs to transmit information. At the same time, the server network manager will continuously recheck the status of service provider #1 so that it will know when it has the option to again transmit information on service provider #1.

The phrase "redundancy scheme," as used above is intended to mean a template which the network manager 22 uses to select a particular network connection to transmit information from an application in one node to an application in another node. The redundancy scheme will assume all of the available network connections are alive and provide a method for selecting a connection dependent upon the task the communications system is undertaking.

Figure 15:
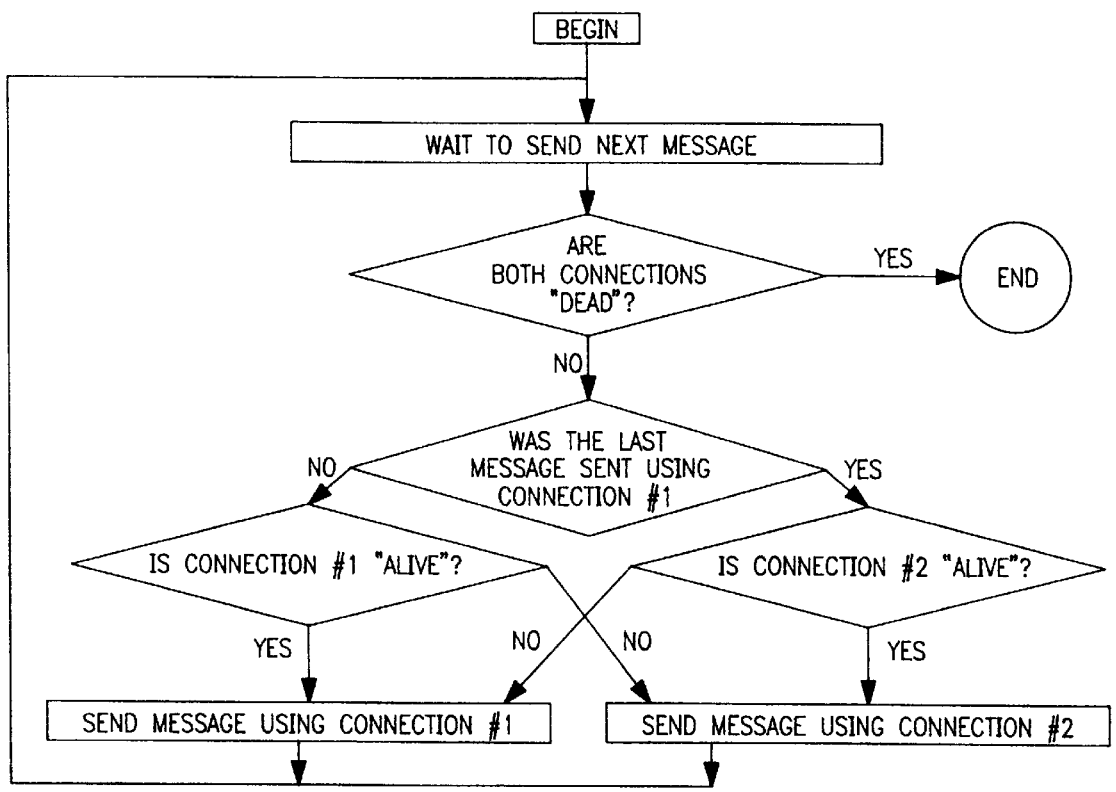
FIG. 15 is a flow chart illustrating an example of a redundancy/backup scheme used in conjunction with the present invention.

An example of one redundancy scheme is illustrated in the flow chart of FIG. 15. Using the network described above in FIG. 14, the redundancy scheme of FIG. 15 simply alternates the selection of the two connections. The first data transmission would be sent through the first network 612, the second data transmission would be sent through the second network 614, the third data transmission would be sent through the first network 612 and so on.

This redundancy scheme will be taken into account by the network manager 22 when selecting a network connection. However, if one of the network connections is found to be "dead" then the network manager 22 will only transmit data through the other connection. The network manager 22 will periodically check the "dead" connection, as discussed above, to determine if the connection is "alive." Once the connection is "alive" again, the network manager 22 will return to following the redundancy scheme.

The redundancy/backup scheme illustrated in FIG. 15 is merely an example of one possible scheme the network manager 22 can be set to follow and is not intended to limit the scope of the present invention.

The present invention may be embodied in other specific forms without departing from the spirit or essential attributes thereof and, accordingly, reference should be made to the appended claims, rather than to the foregoing specification, as indicating the scope of the invention.

TABLE 1

Normal Winsock 2.0 Client/Server Program Execution

| | Client | | | | Server | | | |
|---|---|---|---|---|---|---|---|---|
| Step | Winsock Functions | Winsock Actions | Service Provider Functions | Service Provider Functions | Winsock Functions | Winsock Actions | Service Provider Functions | Service Provider Actions |
| 1 | | | | | WSAStartup | Initialize Winsock resources and call WSPStartup | WSPStartup | Initialize service provider resources |
| 2 | | | | | socket | call WSPSocket | WSPSocket | Create an end point for communication |
| 3 | | | | | bind | Call WSPBind | WSPBind | Assign a local name to an unnamed socket |
| 4 | | | | | listen | call WSPListen | WSPListen | Listing for incoming connections |
| 5 | WSAStartup | Initialize Winsock resources and call WSPStartup | WSPStartup | Initialize service provider resources | | | | |
| 6 | socket | call WSPSocket | WSPSocket | Create an end point for communication | | | | |
| 7 | bind | call WSPBind | WSPBind | Assign a local name to an unnamed socket | | | | |
| 8 | connect | call WSPConnect | WSPConnect | Initiate a connection on a specified socket | | | | |
| 9 | | | | | accept | call WSPAccept | WSPAccept | An incoming connection is accepted and associated with a new socket |
| 10 | send | call WSPSend | WSPSend | Send data | | | | |
| 11 | | | | | recv | call WSPRecv | WSPRecv | Receive data from socket |
| 12 | | | | | send | call WSPSend | WSPSend | Send data |
| 13 | recv | call WSPRecv | WSPRecv | Receive data from socket | | | | |
| 14 | shutdown | call WSPShutdown | WSPShutdown | shutdown a part of a full-duplex connection | shutdown | call WSPShutdown | WPSHutdown | shutdown part of a full-duplex connection |
| 15 | closesocket | call WSPCloseSocket | WSPClose-Socket | Remove socket from socket reference list | closesocket | call WSPCloseSocket | WSPClose-Socket | Remove socket from socket reference list |

TABLE 2

Winsock 2.0 Server Program Execution using MWTSPM

| | Server | | | | | | | | |
|---|---|---|---|---|---|---|---|---|---|
| Step | Winsock Function | Winsock Actions | MWTSPM Functions | MWTSPM Actions | Service Provider #1 Functions | Service Provider #1 Actions | Service Provider #2 Functions | Service Provider #2 Actions |
| 1 | WSA-Startup | Initialize Winsock resources and call WSPStartup | WSPStartup | Initialize service providers resources | WSPStartup | Initialize service provider resources | WSPStartup | Initialize service provider resources |
| 2 | socket | call | WSPSocket | call | WSPSocket | Create an | WSPSocket | Create an |

TABLE 2-continued

Winsock 2.0 Server Program Execution using MWTSPM

| | | | | | Server | | | |
|---|---|---|---|---|---|---|---|---|
| Step | Winsock Function | Winsock Actions | MWTSPM Functions | MWTSPM Actions | Service Provider #1 Functions | Service Provider #1 Actions | Service Provider #2 Functions | Service Provider #2 Actions |
| | | WSPSocket | | WSPSocket of SP1 and SP2 | | end point for communication | | end point for communication |
| 3 | bind | call WSPBind | WSPBind | Assign address to first network and find the address on the other networks which correspond to address on 1st network and call WSPBind of SP1 and SP2 with the appropriate addresses | WSPBind | Assign a local address to an unnamed socket | WSPBind | Assign a local address to an unnamed socket |
| 4 | listen | call WSPListen | WSPListen | call WSPListen for SP1 and SP2. | WSPListen | Listen for incoming connections | WSPListen | Listen for incoming connections |
| | | | | Wait for incoming connection from Client (See Step 4 of Table 3) | | | | |
| 5 | accept | call WSPAccept | WSPAccept | Setup the connect manager to determine when all pipes receive a connection request from the same client and after one of the pipes has received a connection request call WSPAccept of the requested pipe. Wait some period of time for the other pipe's connection. If none received then operate in non-redundant mode. | WSPAccept | An incoming connection is accepted and associated with a new socket. | WSPAccept | An incoming connection is accepted and associated with a new socket |
| | | | | Wait for incoming data request #1 from Client (See step 5 of Table 3) | | | | |
| 6 | recv | call WSPRecv | WSPRecv | call WSPRecv of the appropriate service provider | WSPRecv | Receive data from socket | | |
| 7 | send | call WSPSend | WSPSend | call WSPSend of one of the service providers | WSPSend | Send data | | |
| | | | | Wait for incoming data request #2 from Client (See step 2 of Table 3) | | | | |
| 8 | recv | call WSPRecv | WSPRecv | call WSPRecv of the appropriate service provider | | | WSPRecv | Receive data from socket |
| 9 | send | call WSPSend | WSPSend | Call WSPSend of one of the service providers | | | WSPSend | Send data |
| | | | | Wait for incoming data request #3 from Client (See step 9 of Table 3) | | | | |
| 10 | recv | call WSPRecv | WSPRecv | call WSPRecv of the appropriate service provider | WSPRecv | Receive data from socket | | |
| 11 | send | call WSPSend | WSPSend | call WSPSend of one of the service providers | WSPSend | Send data | | |
| | | | | Wait for Incoming data request #4 from Client (See step 12 of Table 3) | | | | |
| 12 | recv | call WSPRecv | WSPRecv | call WSPRecv of the appropriate service provider | | | WSPRecv | Receive data from socket |

TABLE 2-continued

Winsock 2.0 Server Program Execution using MWTSPM

Server

| Step | Winsock Function | Winsock Actions | MWTSPM Functions | MWTSPM Actions | Service Provider #1 Functions | Service Provider #1 Actions | Service Provider #2 Functions | Service Provider #2 Actions |
|---|---|---|---|---|---|---|---|---|
| 13 | send | WSPSend | WSPSend | call WSPSend of one of the service providers | | | WSPSend | send data |
| 14 | shutdown | call WSPShutdown | WSPShutdown | call WSPShutdown of SP1 and SP2 | WSPShutdown | shutdown part of a full-duplex connection | WSPShutdown | shadows part of a full-duplex connection |
| 15 | close-socket | call WSP-CloseSocket | WSP-CloseSocket | call WSPCloseSocket of SP1 and SP2 | WSPClose-Socket | Remove socket from socket reference list | WSPClose-Socket | Remove socket from socket reference list |

TABLE 3

Winsock 2.0 Client Program Execution using MWTSPM

Client

| Step | Winsock Functions | Winsock Actions | MWTSPM Functions | MWTSPM Actions | Service Provider #1 Functions | Service Provider #1 Actions | Service Provider #2 Functions | Service Provider #2 Actions |
|---|---|---|---|---|---|---|---|---|
| 1 | WSA-Startup | Initialize Winsock resources and call WSPStartup | WSPStartup | Initialize service providers resources | WSPStartup | Initialize service provider resources | WSPStartup | Initialize service provider resources |
| 2 | socket | call WSPSocket | WSPSocket | call WSPSocket of SP1 and SP2 | WPSSocket | Create an end point for communication | WSPSocket | Create an end point for communication |
| 3 | bind | call WSPBind | WSPBind | Find the address on the other network and call WSPBind of SP1 and SP2 with the appropriate addresses | | | | |
| 4 | connect | call WSPConnect | WSPConnect | call WSPConnect of SP1 and SP2 | WSPConnect | Initiate a connection on a specified socket | WSPConnect | Initiate a connection on a specified socket |
| 5 | send | call WSPSend | WSPSend | call WSPSend of one of the service providers | WSPSend | Send data | | |
| | | | | Wait for response from request #1 from Server (See step 7 of Table 2) | | | | |
| 6 | recv | call WSPRecv | WSPRecv | call WSPRecv of the appropriate provider | WSPRecv | Receive data from socket | | |
| 7 | send | call WSPSend | WSPSend | call WSPSend of one of the service providers | | | WSPSend | Send data |
| | | | | Wait for response from request #2 from Server (See step 9 of Table 2) | | | | |
| 8 | recv | call WSPRecv | WSPRecv | call WSPRecv of the appropriate service provider | | | WSPRecv | Receive data from socket |
| 9 | send | call WSPSend | WSPSend | call WSPSend of the service providers | WSPSend | Send data | | |
| | | | | Wait for response from request #3 from Server (See step 11 of Table 2) | | | | |
| 10 | recv | call WSPRecv | WSPRecv | call WSPRecv of the appropriate service provider | WSPRecv | Receive data from socket | | |

TABLE 3-continued

Winsock 2.0 Client Program Execution using MWTSPM

Client

| Step | Winsock Functions | Winsock Actions | MWTSPM Functions | MWTSPM Actions | Service Provider #1 Functions | Service Provider #1 Actions | Service Provider #2 Functions | Service Provider #2 Actions |
|---|---|---|---|---|---|---|---|---|
| 11 | send | call WSPSend | WSPSend | call WSPSend of the service provider | | | WSPSend | WSPSend |
| | | | | Wait for response from request #4 from Server (See step 13 of Table 2) | | | | |
| 12 | recv | call WSPRecv | WSPRecv | call WSPRecv of the appropriate service provider | | | WSPRecv | Receive data from socket |
| 13 | shutdown | call WSPShutdown | WSPShutdown | call WSPShutdown of SP1 and SP2 | WSPShutdown | shutdown part of a full-duplex connection | WSPSShut-down | shutdown part of a full-duplex connection |
| 14 | close socket | callWSP-CloseSocket | WSPClose-Socket | call WSPSCloseSocket of SP1 and SP2 | WSPClose-Socket | Remove socket from socket reference list | WSPClose-Socket | Remove socket from socket reference list |

What is claimed is:

1. A method of managing a communications network having a plurality of nodes, each node capable of running at least one of a plurality of applications, and a plurality of transport service providers, each transport service provider linked to a network driver for establishing a network connection and an interface linked to the at least one application for enabling any of the plurality of applications to communicate with each of the plurality of transport service providers, the method comprising the steps of:

in each of a first and a second node, preparing at least two of the plurality of transport service providers for establishing a network connection through each of the at least two transport service providers and associating them with each other and an application in response to a request from the application to the interface for a single network connection;

establishing network connection between each of the at least two transport service providers in the first node and corresponding transport service providers in the second node;

monitoring and determining network connection condition; and selectively transmitting information via a selected one network connection.

2. A method as set forth in claim 1, further comprising the steps of:

in the first node, monitoring request for connection received from the second node to connect one of the at least two transport service providers in the first node to a corresponding transport service provider in the second node;

executing the establishing step in response to a connection request;

after a first request for connection from the first node has been received, monitoring for a preselected period of time connection status of all of the at least two transport service providers to determine if each of the transport service providers has received a request for connection from the first node;

after the preselected period of time has elapsed, reporting the connection status of the at least two transport service providers to the log.

3. A method as set forth in claim 2, further comprising the steps of:

in the second node, monitoring requests for connection received from the first node to connect one of the at least two transport service providers in the second node to a corresponding transport service provider in the first node.

4. A method as set forth in claim 1, further comprising the steps of:

monitoring the at least two transport service providers for incoming information; and fetching and transferring incoming information to the appropriate application.

5. A method as set forth in claim 1, wherein network connection condition comprises network connection availability, cost, speed and wait time.

6. A method as set forth in claim 1, wherein network connection selection is based upon one of a plurality of available redundancy schemes and network connection conditions.

7. A method of managing a client-server communications network having a plurality of nodes, each node capable of running at least one of a plurality of applications and a plurality of transport service providers, each transport service provider linked to a network driver for establishing a network connection and an interface enabling any of the plurality of applications to communicate with each of the plurality of transport service providers, the method comprising the steps of:

in each of a first and a second node, preparing at least two of the plurality of transport service providers for establishing a network connection through each of the at least two transport service providers and associating them with each other and an application in response to a request from the application to the interface for a single network connection;

monitoring requests for connection received by the first node from the second node to connect one of the at least two transport service providers in the first node to a corresponding transport service provider in the second node;

establishing network connection in response to a connection request from the second node between the requested transport service provider of the first node and the corresponding transport service provider of the second node each time the first node receives a request for connection;

after a first request for connection from the second node has been received, monitoring for a preselected period of time connection status of all of the at least two transport service providers to determine if each of the transport service providers has received a request for connection from the second node;

after the preselected period of time has elapsed, reporting the connection status of the at least two transport service providers to a log;

monitoring and determining network connection condition;

selectively transmitting information between the first node and the second node via a selected one network connection;

monitoring the at least two transport service providers for incoming information; and fetching and transferring incoming information to the appropriate application.

8. A method as set forth in claim 7, further comprising the steps of:

monitoring requests for connection received by the second node from the first node to connect one of the at least two transport service providers in the second node to a corresponding transport service provider in the first node;

establishing network connection in response to a connection request from the first node between the requested transport service provider of the second node and the corresponding transport service provider of the first node each time the second node receives a request for connection;

after a first request for connection from the first node has been received, monitoring for a preselected period of time connection status of all of the at least two transport service providers to determine if each of the transport service providers has received a request for connection from the first node;

after the preselected period of time has elapsed, reporting the connection status of the at least two transport service providers to the log.

9. A method as set forth in claim 7, wherein network connection condition comprises network connection availability, cost, speed and wait time.

10. A method as set forth in claim 7, wherein network connection selection is based upon a redundancy scheme and network connection condition.

11. A method as set forth in claim 7, further comprising the steps of:

in additional nodes, preparing at least two of the plurality of transport service providers for establishing a network connection through each of the at least two transport service providers and associating them with each other and the application in response to a request from the application to the interface for a single network connection;

establishing network connection between each of the at least two transport service providers in the first node and corresponding transport service providers in at least one of the additional nodes.

12. A method of managing a client-server communications network having a plurality of nodes, each node capable of running a plurality of applications and a plurality of transport service providers, each transport service provider linked to a network driver for establishing a network connection, an interface enabling any of the plurality of applications to communicate with each of the plurality of transport service providers and a manager module having a server manager and a client manager, coupling the interface and at least two of the plurality of transport service providers, the method comprising the steps of:

in each of a first and a second node manager module, preparing at least two of the plurality of transport service providers for establishing a network connection through each of the at least two transport service providers and associating them with each other and an application in response to a request from the application to the interface for a single network connection;

in the server manager,
monitoring connection requests between the first node and the second node to connect one of the at least two transport service providers in the first node to a corresponding transport service provider in the second node;

establishing network connection through a requested transport service provider in response to a connection request each time the connection request is received;

after a first connection request has been received, monitoring for a preselected period of time connection status of all of the at least two transport service providers to determine if each of the transport service providers has received a request for connection;

after the preselected period of time has elapsed, reporting the determined connection status of the at least two transport service providers to a log;

in the client manager,
providing connection requests between the first node and the second node to connect the at least two transport service providers in the first node to corresponding transport service providers in the second node;

monitoring for a preselected period of time receipt of a connection signal indicating an established network connection between each of the at least two transport service providers;

after the preselected period of time has elapsed, reporting the indicated connection status of the at least two transport service providers to the log;

in the first and second node manager module,
monitoring and determining network connection condition;

selectively directing information to a selected one network connection for transmission between the first node and the second node;

monitoring established network connections for incoming information; and fetching and transmitting incoming information to the appropriate application.

13. A method as set forth in claim 12, further comprising the steps of:

in several additional nodes, preparing at least two of the plurality of transport service providers for establishing a network connection through each of the at least two transport service providers and associating them with each other and the application in response to a request from the application to the interface for a single network connection;

in the server manager of each of the first, second and several additional nodes, monitoring connection requests from all other nodes to connect one of the at least two transport service providers in a requested node to a corresponding transport service provider in a requesting node;

establishing network connection through a requested transport service provider in response to a connection request from the requesting node each time the requested node receives the connection request;

after a first connection request from the requesting node has been received, monitoring for a preselected period of time connection status of all of the at least two transport service providers to determine if each of the transport service providers has received a request for connection from the requesting node;

after the preselected period of time has elapsed, reporting the determined connection status of the at least two transport service providers to an requested node log;

in the client manager of one of the first, second and several additional nodes, providing connection requests to at least one other node to connect the at least two transport service providers in the any one node to corresponding transport service providers in the at least one other node;

monitoring for a preselected period of time receipt of a connection signal from the at least one other node indicating an established network connection between each of the at least two transport service providers in the any one node and the corresponding transport service providers in the at least one other node;

after the preselected period of time has elapsed, reporting the connection status of at least two transport service providers to the any one node log.

14. A method as set forth in claim 12, wherein network connection condition comprises network connection availability, cost, speed and wait time.

15. A method as set forth in claim 12, wherein network connection selection is based upon a redundancy scheme and network connection condition.

16. A general purpose digital computer-based communications network system having a plurality of nodes, each node comprising an output device, an input device, a CPU, memory, and a plurality of network cards, the CPU operating under control of an operating system program which controls the output device, the input device, the memory and the plurality of network cards, the memory comprising:

an application program section for storing a plurality of applications;

a network communications software section having a set of instructions for controlling the general purpose digital computer to perform network connections between the plurality of nodes, the network communications software section comprising:

a plurality of communications protocol stacks for establishing a network connection to another node, each stack linked to one of the plurality of network cards;

an interface section enabling any of the plurality of applications to communicate with any one of the plurality of communication protocol stacks; and a network manager section linked to at least two of the plurality of communications protocol stacks and the interface section, the network manager section comprising:

a stack connector section to prepare the at least two communications protocol stacks for establishing a network connection through each of the at least two communications protocol stacks and associating them with each other and a application in response to a request from the application to the interface section for a single network connection;

a connection manager section to establish network connection from each of the at least two communications protocol stacks of a first node to a corresponding communications protocol stack of a second node;

a health manager section to monitor and determine network connection condition; and a transmission manager section to selectively transmit information via a selected one network connection.

17. A general purpose digital computer-based communications network system having a plurality of nodes, each node comprising an output device, an input device, a CPU, memory, and a plurality of network cards, the CPU operating under control of an operating system program which controls the output device, the input device, the memory and the plurality of network cards, the memory comprising:

an application program section for storing a plurality of applications;

a network communications software section having a set of instructions for controlling the general purpose digital computer to perform network connections between the plurality of nodes, the network communications software section comprising:

a plurality of communications protocol stacks for establishing a network connection to another node, each stack linked to one of the plurality of network cards;

an interface section enabling any of the plurality of applications to communicate with any one of the plurality of communication protocol stacks; and a network manager section linked to at least two of the plurality of communications protocol stacks and the interface section, the network manager section comprising:

a stack connector section to prepare the at least two communications protocol stacks for establishing a network connection through each of the at least two communications protocol stacks and associating them with each other and an application in response to a request from the application to the interface section for a single network connection;

a server connection manager section to monitor requests for connection, received by a server node from a client node, to connect one of the at least two communications protocol stacks in the server node to a corresponding communications protocol stack in the client node;

a client connection manager section to request connections from the client node to the server node to connect all of the at least two communications protocol stacks in the client node to corresponding communications stacks in the server node;

a network connector section to establish network connection in response to a connection request from the client node between the requested communications protocol stack of the server node and the corresponding communications protocol stack of the client node, each time the server node receives a request for connection;

a status manager section to monitor for a preselected period of time connection status of all of the at least two communications protocol stacks, after a first request for connection from the client node has been received to determine if each of the at least two communications protocol stacks has received a request for connection from the client node;

a reporter section to report the connection status of the at least two communications protocol stacks to a log after the preselected period of time has elapsed;

a health manager section to monitor and determine network connection condition;

a transmission manager section to selectively transmit application program information between the server node and the client node via a selected one of the network connections;

a receive manager section to monitor the at least two communications protocol stacks for incoming application program information; and a transfer manager section to fetch and transfer detected incoming application program information to the appropriate application program.

\* \* \* \* \*